L. STERNE.
Car Spring.
No. 87,307. Patented Feb. 23, 1869.
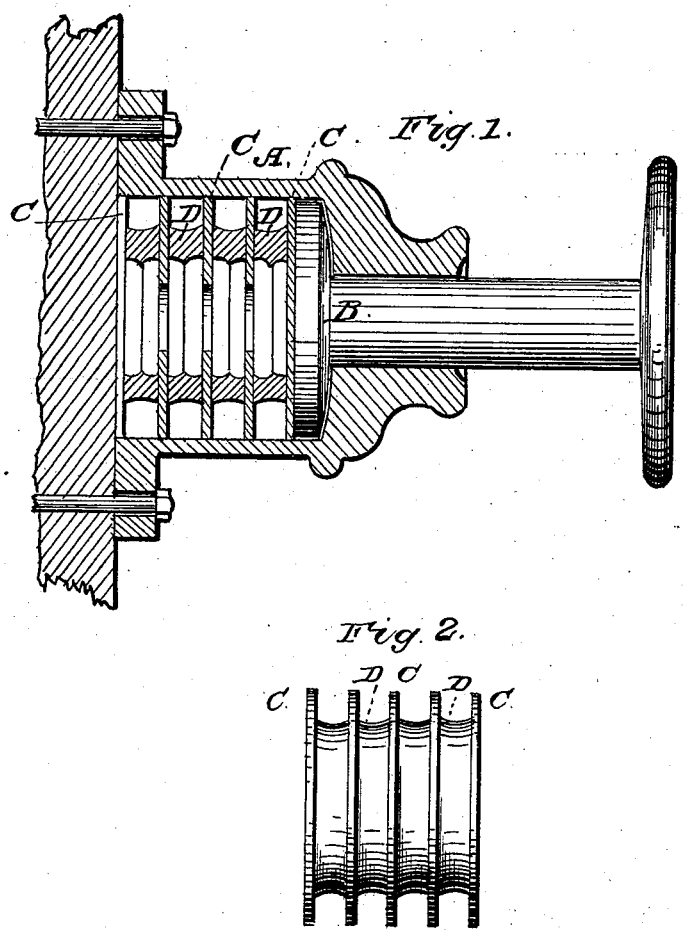

UNITED STATES PATENT OFFICE.

LOUIS STERNE, OF LONDON, ENGLAND.

Letters Patent No. 87,307, dated February 23, 1869.

IMPROVED PNEUMATIC SPRING.

The Schedule referred to in these Letters Patent and making part of the same.

*To all whom it may concern:*

Be it known that I, LOUIS STERNE, a citizen of the United States, now residing in London, in the county of Middlesex, have invented a new and useful Pneumatic Spring, of which the following is a full, clear, and exact description, reference being had to the accompanying drawing, forming part of this specification, and in which—

Figure 1 represents a sectional view of my pneumatic spring as applied to a buffer, and Figure 2, an outside view of said spring detached.

Similar letters of reference indicate corresponding parts.

My invention consists in a novel construction of spring, more particularly applicable to or as buffers, bearing and drawing springs for railway purposes, which is of the character of a pneumatic rubber spring, and is made or built up of soft India-rubber rings, and circular or other suitabl shaped metal-plates, the rubber rings being chemically united to the plates during the process of vulcanization, and being alternately arranged in relation to said plates, the outer ones of which are of a close character, while the inner plates are of an open construction inside the spring thus formed, that is, thus made to constitute a hollow air-tight spring, acting both by compression of the rubber and of the air contained within it.

Referring to the accompanying drawing—

A represents the box or case of a buffer, and B the plunger thereof, either or both being made of wrought or cast-metal, as desired.

The spring arranged within the case A, and against which the plunger B is caused to bear or act, is composed of any suitable number of circular steel or other metal plates, having interposed between them soft-rubber rings D, which are chemically united to the plates during the process of vulcanization.

The two end or outer plates C are of a close character, while the inner of such plates are open at their centres, so as to form of the whole an air-tight chamber.

When force is exerted upon the buffer, the soft-rubber rings are compressed, likewise the enclosed air, and thus is obtained a combination of an India-rubber spring and air-buffer, both working in perfect harmony, the rubber first being compressed, and afterward being relieved, or assisted, by the compression of the air, so that when the rubber is brought to a dead pressure, the air exerts a lively elastic force, which aids or quickens the rubber in its returning action.

Independently, however, of the action of the enclosed air, the spring may be made sufficiently strong to act as an ordinary India-rubber buffer.

It is desirable to make the rubber springs D of such a shape as that, when under pressure, they present a convex or inwardly-protruding form to the action of the enclosed air.

Also, to avoid friction upon the rubber, by which it would be quickly destroyed, the plates C are made to extend, beyond the rubber rings, to a distance proportionate to the depth of said rings, so that the India rubber cannot be injured, or come in contact with the inner surface of the outer case.

Of course these springs or buffers can be made of any general contour, and any number of air-tight chambers be built up, according to the length required.

No mechanical fittings are necessary to make a perfectly air-tight chamber, and as the union of the rubber with the metal plates is of a solid, and not merely adhesive character, the juncture is an impervious one.

Here it may be repeated that a spring or buffer, thus constructed, combines two elastic media, namely, rubber and air. The latter, being obtained free, does not add to the cost of the spring, and the two combined are capable of absorbing more pressure, and possess, at the same time, greater sensitiveness than springs embracing no such combination of actions or forces. Unlike a steel spring, which, if made to absorb great pressure, is rigid until a considerable initial weight is brought to bear upon it, a spring or buffer constructed as herein described, if made to absorb an amount of pressure greater than a steel or other description of spring is made to sustain, is yet sensitive to a very slight pressure.

A spring or buffer, too, constructed as described, is attendant with great saving of space, as to get a given stroke it requires to be of comparatively short length; likewise is light, and free of overhanging weight; also not liable to accident from breakage.

The union of the metal plates C, when composed of steel or iron, with the rubber rings D, may be effected as follows:

Said plates are first ground upon emery wheels until their surfaces or faces are perfectly free from scale or oxidized matter. They are then placed in a bath, prepared to deposit the necessary precipitation of copper and zinc by the electro-metalurgical process. After said plates are thus coated, they are thrown into sawdust, to dry them, where they must be kept free from any foreign substance, and, as soon as practicable, are arranged with the rubber rings interposed between them. Said rings are cut out of sheet-rubber of the required thickness, and placed in moulds of suitable shape or form, with plaster fillings, formed in halves, to said rings, and with sectional or divided iron rings around the exterior or outer periphery of the rubber rings.

The whole mass, having the rubber rings properly arranged, or interposed between the metal plates, is then placed in a wrought-iron cylinder, formed with strong iron plates at top and bottom, and, after it has been compressed, and brought under a heavy pressure, is clamped down, and while thus compressed is exposed to a curing or vulcanizing process for any necessary time, according to the quality of, or compounds used in the preparation of the rubber.

After the curing has been effected, the moulds are allowed to cool, and then removed, and the plaster broken or drilled out, and after cleaning, a proper finish given to the end plates of the spring.

Brass plates, instead of steel or iron, coated as described, may, if preferred, be used.

What is here claimed, and desired to be secured by Letters Patent, is—

A pneumatic spring, formed of metal plates and rubber rings, or bodies, constructed, arranged, and united to form an air-tight chamber, and for action in concert, substantially as specified.

LOUIS STERNE.

Witnesses:
F. W. ATKINSON, *Clerk*,
D. S. BARKER, *Clerk*,
*Consulate U. S. A., London.*